(12) United States Patent
Murakami et al.

(10) Patent No.: US 7,064,905 B2
(45) Date of Patent: Jun. 20, 2006

(54) IMAGING LENS (75) Inventors: Kazuya Murakami, Itabashi-ku (JP);
Yasuhiko Abe, Toda (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/198,753

(22) Filed: Aug. 5, 2005

(65) Prior Publication Data
US 2006/0028740 A1    Feb. 9, 2006

(30) Foreign Application Priority Data
Aug. 6, 2004    (JP)    ............................. 2004-231257

(51) Int. Cl.
*G02B 9/12* (2006.01)
(52) U.S. Cl. .................. 359/784; 359/791; 359/789
(58) Field of Classification Search ................ 359/784, 359/791, 789, 790, 779, 772, 767, 768, 769
See application file for complete search history.

(56) References Cited

U.S. PATENT DOCUMENTS

| | | | | |
|---|---|---|---|---|
| 4,659,186 A * | 4/1987 | Sato et al. | ................... | 359/692 |
| 2004/0012861 A1* | 1/2004 | Yamaguchi | ................ | 359/772 |
| 2004/0196575 A1* | 10/2004 | Nozawa | ...................... | 359/791 |

FOREIGN PATENT DOCUMENTS

| JP | 05-188284 A1 | 7/1993 |
|---|---|---|
| JP | 09-133860 A1 | 5/1997 |

* cited by examiner

*Primary Examiner*—Timothy Thompson
(74) *Attorney, Agent, or Firm*—Darby & Darby

(57) ABSTRACT

The present invention includes, from an object side to an image-plane side: an aperture stop with a predetermined diameter, a first lens with a positive refractive power having a convex surface on the object side, a second lens with a positive refractive power having a concave surface on the object side, and a third lens with a negative refractive power having a convex surface on the object side. The second and third lenses have aspherical surfaces on their object-side and image-plane-side surfaces. The third lens is formed with an inflection point where the curvature orientation changes within the effective diameter range of the aspherical surface on the image-plane side. An appropriate back focus is maintained while the total length of the lens system is reduced. A compact, thin, high-performance design is achieved, which effectively corrects various aberrations, especially astigmatism and distortion, and is suited for digital cameras using high-density solid-state imaging elements of one million pixels or more.

19 Claims, 6 Drawing Sheets

FIGURE 4A
FNo.=2.89
Spherical Aberration

FIGURE 4B
2ω = 63.4°
Astigmatism

FIGURE 4C
2ω = 63.4°
Distortion

FIGURE 4D
2ω = 63.4°
Lateral Chromatic Aberration

FNo.=2.89

Spherical Aberration

Astigmatism

Distortion

Lateral Chromatic Aberration

IMAGING LENS

INCORPORATION BY REFERENCE

The present application claims priority under 35 U.S.C. §119 to Japanese Patent Application No. 2004-231257 filed on Aug. 6, 2004. The content of the application is incorporated herein by reference in its entirety.

FIELD OF THE INVENTION

The present invention relates to a compact imaging lens used in digital still cameras and digital video cameras and the like equipped with a solid-state imaging element such as CCD (Charge Coupled Device) or CMOS (complementary metal oxide semiconductor). More specifically, the present invention relates to an imaging lens suitable for a compact mobile camera installed in a portable device such as a portable telephone, personal digital assistant (PDA), or portable personal computer.

BACKGROUND OF THE INVENTION

In recent years, there have been advances in the technology for solid-state imaging elements that include not only CCDs but also CMOS elements. For solid-state imaging elements in digital still cameras, these CCD elements and CMOS elements are used together. Since CMOS elements generally have a low light-sensitivity, it is preferable for the imaging lenses used with these elements to be bright lenses (lenses with small F numbers) in addition to being high-performance, compact, thin, and provided at a low cost.

In these solid-state imaging elements, microlenses are disposed on the surface thereof in order to allow efficient entry of light. Therefore, if the angle of the light entering into the solid-state imaging element is too large, "vignetting" takes place and the light does not enter into the solid-state imaging element. Therefore, it is preferable to use a telecentric optical system with a small angle of emergence and with the exit pupil of the imaging lens being as far away as possible from the imaging surface.

With the significant advances in solid-state imaging elements, it is now known that "vignetting" can be eliminated if the imaging lens has an angle of emergence in a range of approximately 20 degrees to 24 degrees.

Also, the back focus must be adequately long because of the need to place a low-pass filter for preventing color moires or an infrared cut filter for correcting the spectral sensitivity of the solid-state imaging element between the imaging lens and the solid-state imaging element.

In the imaging lens described in Japanese Laid-Open Patent Publication Number Hei 09-133860, the aperture stop is disposed closest to the imaging surface, thus shortening the exit pupil position. This makes it difficult to reduce the angle of emergence and to keep the total length of the lens system short.

Also, in the imaging lens described in Japanese Laid-Open Patent Publication Number Hei 05-188284, the aperture stop is disposed furthest toward the object side, but since there is no inflection point on the aspherical surface of the third lens or in the lens system, it is difficult to keep the angle of emergence small and to keep the total length of the lens system short.

SUMMARY OF THE INVENTION

The present invention overcomes the problems described above and provides a bright (with a small F number) imaging lens with superior optical characteristics wherein, by using an extremely simple three-group, three-lens structure and setting the lens shapes and aspherical surface shapes appropriately, it is possible to have a compact, thin, light-weight design that can be used for solid-state imaging elements with one million pixels or more and that can be installed in portable devices such as portable telephones and personal digital assistants.

An imaging lens according to the present invention includes, in sequence from an object side to an image plane side: an aperture stop with a predetermined diameter, a first lens with an overall positive refractive power having a convex surface facing the object side, a second lens with an overall positive refractive power having a concave surface facing the object side, and a third lens with an overall negative refractive power having a concave surfaces facing the object side. The second lens is formed with aspherical surfaces on both the object side and the image plane side. The third lens is formed with aspherical surfaces on both the object side and the image plane side, and an inflection point, where a curvature orientation changes, is formed within an effective diameter range of the aspherical surface on the image side.

With this structure, since the first lens and the second lens have positive refractive power and the third lens has a negative refractive power, an appropriate back focus can be maintained while the total length of the lens system can be reduced. Along with the reduction in length and increased compactness, since the object-side and image-plane-side surfaces of the second lens and the third lens are formed as aspherical surfaces and an inflection point is formed within the effective range of the aspherical surface on the image-plane side of the third lens, the total length can be reduced, various aberrations, especially astigmatism and distortion, can be corrected, and the angle of emergence can be reduced.

In the structure described above, the first lens can be formed in a meniscus shape with a convex surface on the object side and a concave surface on the image plane side.

With this structure, spherical aberration can be effectively corrected.

In the structure described above, the object-side aspherical surface of the third lens is formed so that refractive power thereof increases toward a perimeter section thereof.

With this structure, since the refractive power at the inflection section of the third lens is positive, light beams passing through the lens outward from the inflection point worsens the lateral chromatic aberration, but the increase in refractive power toward the peripheral sections restricts the worsening of the lateral chromatic aberration, thus providing superior optical performance.

In the structure described above, the second lens and the third lens are formed from a resin material.

With this structure, the lens can be made lighter and less expensive compared to the use of glass material. In particular, aspherical surfaces and surfaces with inflection points can be easily molded.

In the structure described above, a condition (1) below can be met:

$$TL/f < 1.4 \qquad (1)$$

where f is a focal length of a lens system, and TL is a total length (air conversion distance) of the lens system from the aperture stop to the image surface.

With this structure, the total length of the lens system can be reduced, and a more compact and thinner design can be achieved.

In the structure described above, a conditions (2) below can be met:

$$v1>45, v2>45, v3<45 \quad (2)$$

where v1 is the Abbe number of the first lens, v2 is the Abbe number of the second lens, and v3 is the Abbe number of the third lens.

With this structure, longitudinal chromatic aberration and lateral chromatic aberration from the center to the perimeter in particular can be effectively corrected. As a result, a high resolution can be obtained even for bright lenses with small F numbers.

In the structure described above, a condition (3) and a condition (4) below can be met:

$$1<|R4|/|R5|<2 \quad (3)$$

$$6<|R6|/|R7|<10 \quad (4)$$

where R4 is a curvature radius of the object-side surface of the second lens, R5 is a curvature radius of the image-plane side surface of the second lens, R6 is a curvature radius of the object-side surface of the third lens, and R7 is a curvature radius of the image-plane side surface of the third lens.

With this structure, an appropriate back focus can be maintained while the length of the total lens system can be reduced. Also, various aberrations, especially astigmatism and distortion, can be corrected effectively, providing superior optical performance.

In the structure described above, a condition (5) below can be met:

$$D5/f<0.15 \quad (5)$$

where f is a focal length of the lens system and D5 is a distance along an optical axis between the second lens and the third lens.

With this structure, the outer diameter dimension of the lens system can be reduced and various aberrations, especially astigmatism and distortion, can be effectively corrected, thus providing superior optical performance.

In the structure described above, a condition (6) below can be met:

$$0.45<D4/D6<1.0 \quad (6)$$

where D4 is a thickness along the optical axis of the second lens and D6 is a thickness along the optical axis of the third lens.

With this structure, the total length of the lens system can be reduced while maintaining an appropriate back focus. Various aberrations, especially astigmatism, can be effectively corrected, providing superior optical performance.

With the imaging lens of the present invention as described above, an imaging lens can be provided that is suited for mobile cameras installed in portable devices such as portable telephones and personal digital assistants for the effort that can be made compact, thin, light-weight, and provided at a low cost. More specifically, the total length of the lens system can be reduced (e.g., to no more than 8 mm) according to the size of the imaging element, e.g., a CCD, thus providing a bright (small F number) imaging lens with superior optical characteristics that is compact and thin providing effective correction of various aberrations.

The above, and other objects, features and advantages of the present invention are apparent from the following description read in conjunction with the accompanying drawings, in which like reference numerals designate the same elements.

DETAILED DESCRIPTION OF THE PREFERRED EMBODIMENTS

The preferred embodiments of the present invention are described below, with references to the attached drawings.

Figure 1:
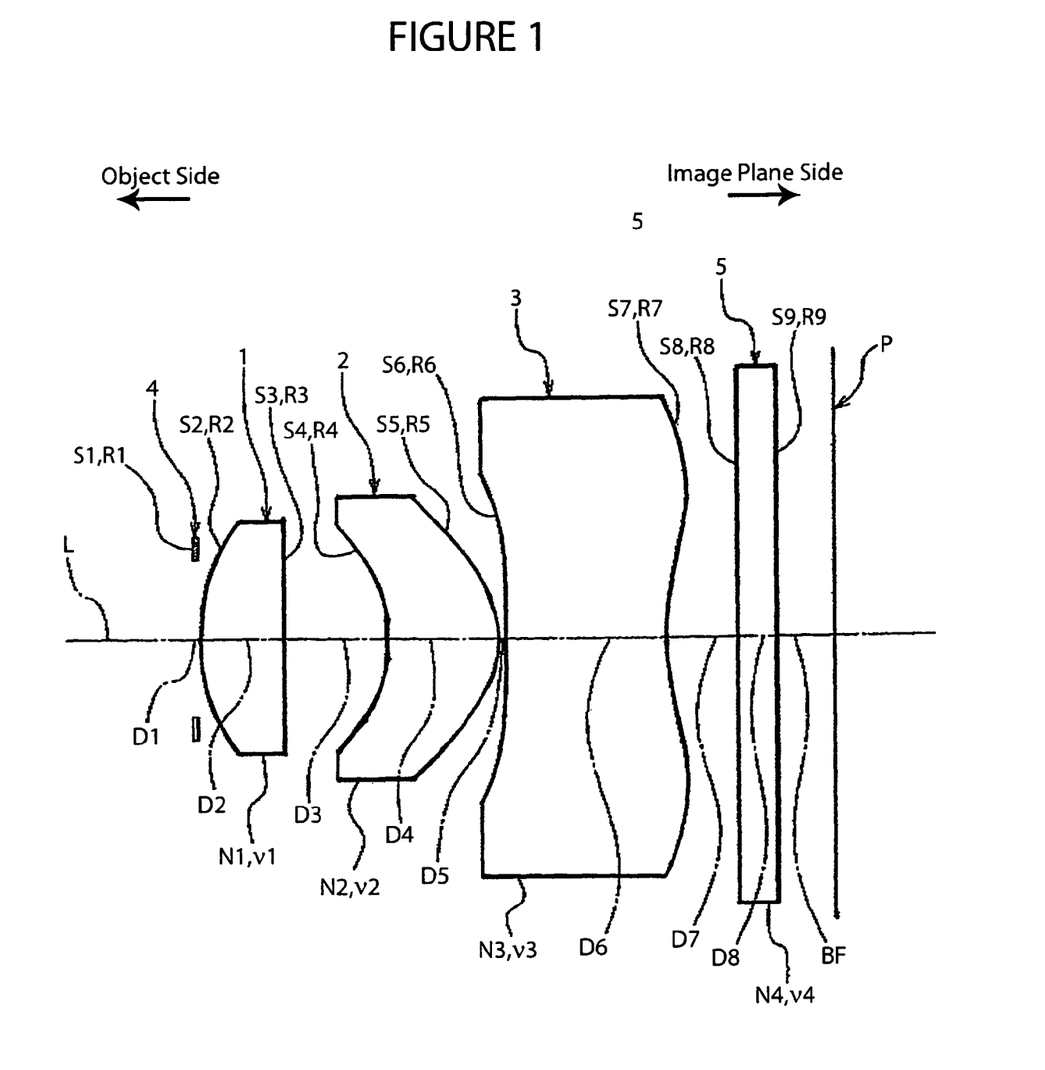
FIG. 1 is a drawing showing the structure of an imaging lens according to the first embodiment of the present invention.
Figure 2A:
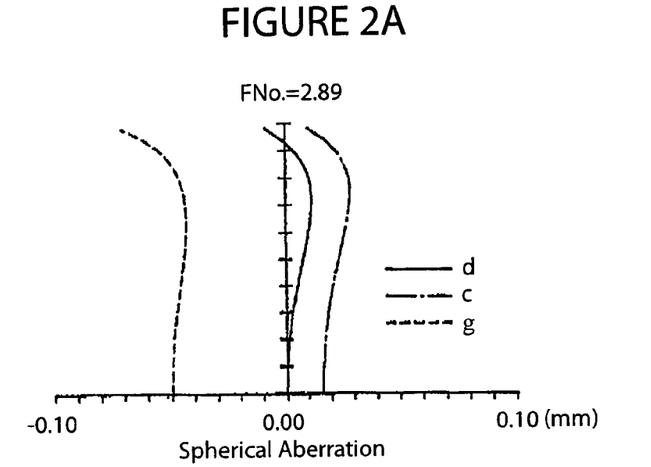
FIGS. 2A–2D show aberration diagrams for spherical aberration, astigmatism, distortion, and lateral chromatic aberration for an imaging lens according to the first embodiment.
Figure 2B:
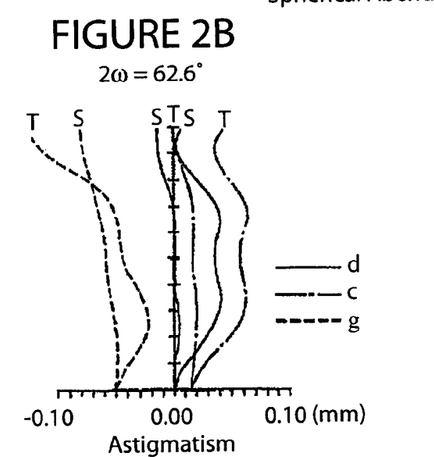
Figure 2C:
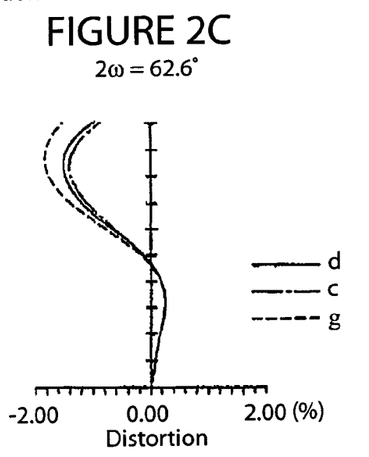
Figure 2D:
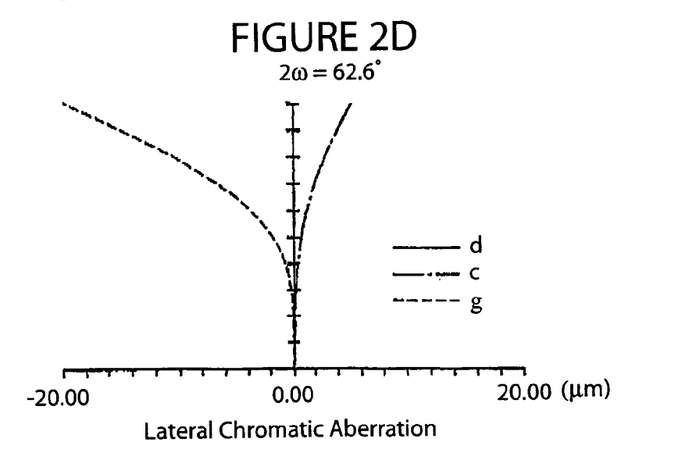

FIG. 1 shows the basic structure of a lens system according to a first embodiment of the imaging lens of the present invention.

As shown in FIG. 1, this imaging lens includes the following elements along an optical axis L, going from the object side to the image plane side: an aperture stop 4 having a predetermined diameter, a first lens 1 with a convex surface facing toward the object side having an overall positive refractive power, a second lens 2 with a concave surface facing toward the object side having an overall positive refractive power, and a third lens 3 with a concave surface facing toward the object side having an overall negative refractive power. Also, in the arrangement described above, a glass filter 5, e.g., an infrared cut filter or a low-pass filter, is disposed behind the third lens 3, and an image plane P, e.g., a CCD, is disposed behind that.

More specifically, the imaging lens is formed with a three-group, three-lens structure, with the first lens group formed by the first lens 1, the second lens group formed by the second lens 2, and the third lens group formed by the third lens 3.

As shown in FIG. 1, in the aperture stop 4, the first lens 1, the second lens 2, the third lens 3, and the glass filter 5, the planes thereof are labeled Si (i=1–9), the curvature radii of these planes Si are labeled Ri (i=1–9), and the indices of refraction and the Abbe numbers along a line d for the first lens 1, the second lens 2, the third lens 3, and the glass filter 5, are labeled Ni and vi (i=1–4), respectively. Furthermore, the distances (thickness, air distance) along the optical axis L for the aperture stop 4 through the glass filter 5 are labeled Di (i=1–8), and the back focus from the glass filter 5 to the image plane P is labeled BF. Also, the focal length of the lens system according to the above structure is labeled F, the total length along the optical axis L of the lens system from the aperture stop 4 to the image plane P is labeled TL (air conversion distance), and the distance between the second lens 2 and the third lens 3 along the optical axis L is labeled D5.

The first lens 1 is formed from a glass material or a resin material as a meniscus lens having an overall positive refractive power with the object side surface S2 formed as a convex surface and the image plane side surface S3 formed as a concave surface.

The second lens 2 is formed from a resin material, e.g., plastic, as a meniscus lens having an overall positive refractive power with the object side surface S4 formed as a concave surface and the image plane side surface S5 formed as a convex surface. Also, the object-side surface S4 and the image-plane side surface S5 of the second lens 2 are both formed as aspherical surfaces.

The third lens 3 is formed from a resin material, e.g., plastic, as a bi-concave lens having an overall negative refractive power with an object-side surface S6 formed as a concave surface and an image-plane side surface S7 formed as a concave surface. Also, the object-side surface S6 and the image-plane side surface S7 of the third lens 3 are both formed as aspherical surfaces. Furthermore, the aspherical surface S7 on the image-plane side of the third lens 3 is formed with an inflection point within the effective diameter range where the orientation of the curvature changes. Also, the object-side aspherical surface S6 of the third lens 3 is formed so that the refractive power increases toward the edges.

By providing a positive refractive power for the first lens 1 and the second lens 2, and a negative refractive power for the third lens 3, as described above, an appropriate back focus can be maintained while reducing the total length TL of the lens system. In addition to this reduced length and compact design, it is possible to keep the total length short, to effectively correct various aberrations, especially astigmatism and distortion, and to reduce the angle of emergence, by using aspherical surfaces for the surfaces S4, S5, S6, S7 on the object side and the image plane side of the second lens 2 and the third lens 3, and by forming an inflection point within the effective range of the aspherical surface S7 on the image plane side of the third lens 3.

Also, by forming the first lens 1 as a meniscus lens, various aberrations, especially spherical aberration, can be effectively corrected.

Also, by forming the aspherical surface S6 on the object side of the third lens 3 so that the refractive power increases toward the edges, lateral chromatic aberration can be limited and superior optical performance can be provided.

Furthermore, by forming the second lens 2 and third lens 3 from a resin material, the lens system can be lighter and less expensive than using glass material. In particular, this makes it easier to mold aspherical surfaces and surfaces with inflection points.

The equation representing the aspherical surfaces for the second lens 2 and the third lens 3 is defined as follows:

$$Z=Cy^2/[1+(1-\epsilon C^2 y^2)^{1/2}]+Dy^4+Ey^6+Fy^8+Gy^{10}+Hy^{12}$$

where: Z is the distance from the tangent surface at the apex of the aspherical surface to the point on the aspherical surface where the height from the optical axis L is y; y is the height from the optical axis; C is the curvature (1/R) at the apex of the aspherical surface; $\epsilon$ is the conic constant; and D, E, F, G, H are aspherical surface coefficients.

According to an embodiment of the present invention, in the structure described above, the focal length F of the lens system and the total length TL (air conversion distance) of the lens system are set up so that they satisfy the following condition (1):

$$TL/f<1.4 \quad (1)$$

This condition defines the proportion between the dimension of the lens system along the optical axis L and the appropriate focal length F of the overall lens system. More specifically, by meeting this condition, the total length TL of the lens system can be made shorter, thus providing a thin, compact lens system design.

Also, according to an embodiment of the present invention, in the structure described above, the Abbe number v1 of the first lens 1, the Abbe number v2 of the second lens 2, and the Abbe number v3 of the third lens 3 satisfy the following conditions (2):

$$v1>45, v2>45, v3<45 \quad (2)$$

These conditions define the appropriate Abbe number ranges. By meeting these conditions, various aberrations, especially longitudinal chromatic aberration and lateral chromatic aberration from the center to the edges, can be effectively corrected, thereby providing a high-resolution for bright lenses with small F numbers.

Also, according to an embodiment of the present invention, in the structure described above, the curvature radius R4 of the object-side surface S4 and the curvature radius R5 of the image-plane side surface S5 of the second lens 2, and the curvature radius R6 of the object-side surface S6 and the curvature radius R7 of the image-side surface S7 of the third lens 3 satisfy the following conditions (3), (4):

$$1<|R4|/|R5|<2 \quad (3)$$

$$6<|R6|/|R7|<10 \quad (4)$$

These relationships define the ratios of the curvature radii of the second lens 2 and the third lens 3. By meeting these conditions, an appropriate back focus can be maintained while the total length TL of the lens system can be kept short, and various aberrations, especially astigmatism and distortion, can be effectively corrected. This results in superior optical performance.

According to an embodiment of the present invention, in the structure described above, the focal length f of the lens system and the distance D5 between the second lens 2 and the third lens 3 along the optical axis L satisfy the following condition (5):

$$D5/f<0.15 \quad (5)$$

This condition defines the distances along the optical axis of the second lens 2 and the third lens 3. If this condition is not met, the angle of light incidence to the CCD is smaller, thus being advantageous, but results in a longer total length TL for the lens system, a larger outer diameter for the third lens 3, and more difficulties for correcting astigmatism and distortion. Therefore, by meeting this condition, the outer diameter of the lens system can be reduced and astigmatism and distortion can be effectively corrected, thus providing superior optical performance.

Furthermore, according to an embodiment of the present invention, in the structure described above, the thickness D4 along the optical axis L of the second lens 2 and the thickness D6 along the optical axis L of the third lens 3 meet the following condition (6):

$$0.45<D4/D6<1.0 \quad (6)$$

This relationship defines the ratio for appropriate thicknesses for the second lens 2 and the third lens 3. By meeting this condition, the total length TL of the lens system can be reduced, an appropriate back focus can be maintained, and various aberrations, especially astigmatism, can be effectively corrected, thus providing superior optical performance.

Figure 3:
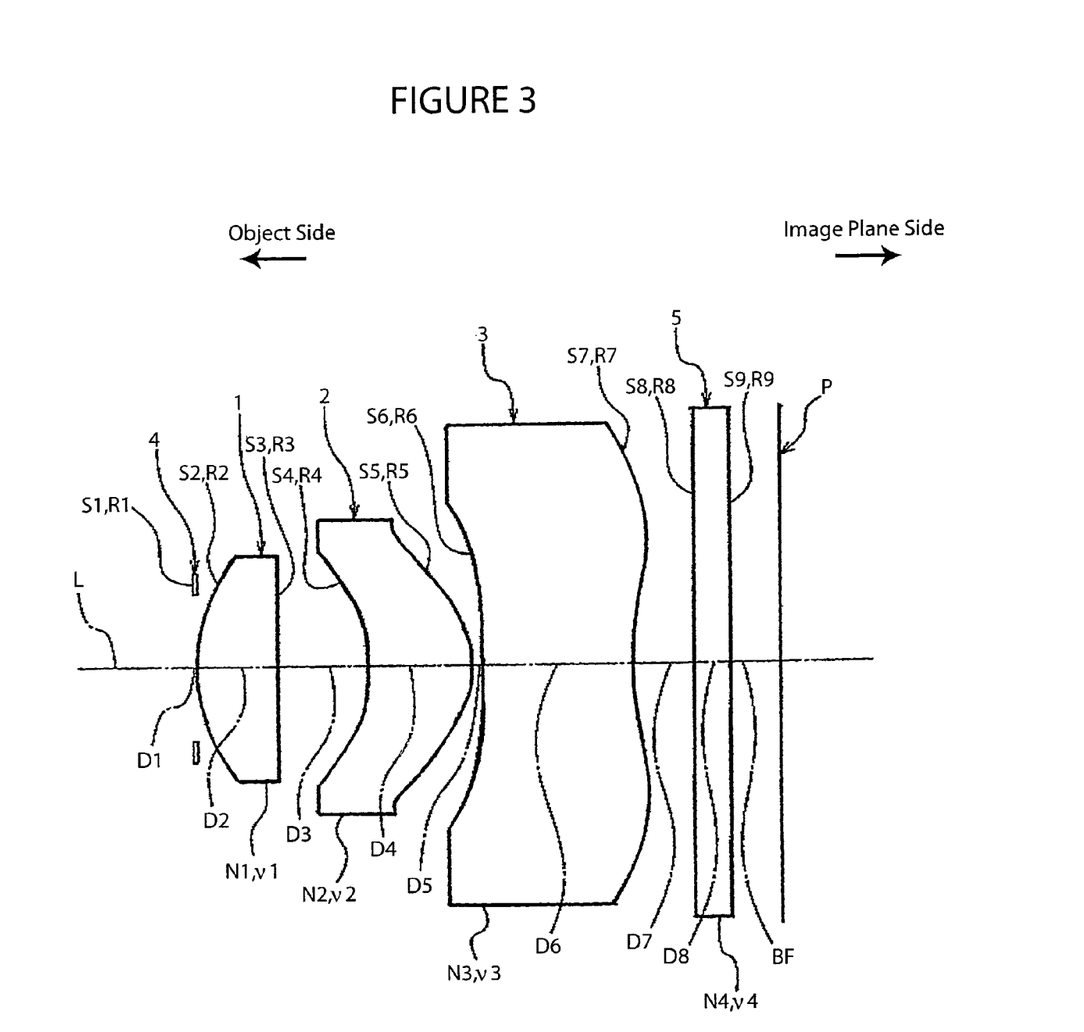
FIG. 3 is a drawing showing the structure of an imaging lens according to the second embodiment of the present invention.
Figure 4A:
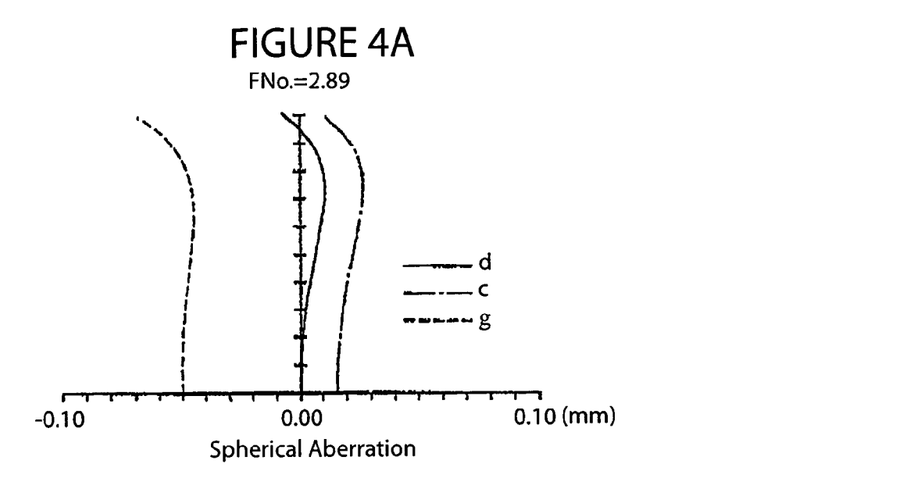
FIGS. 4A–4D show aberration diagrams for spherical aberration, astigmatism, distortion, and lateral chromatic aberration for an imaging lens according to the second embodiment.
Figure 4B:
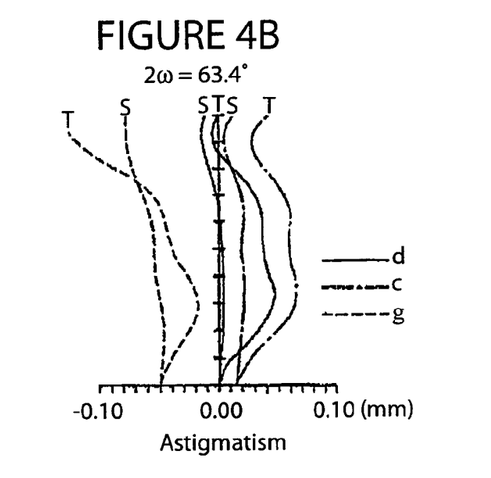
Figure 4C:
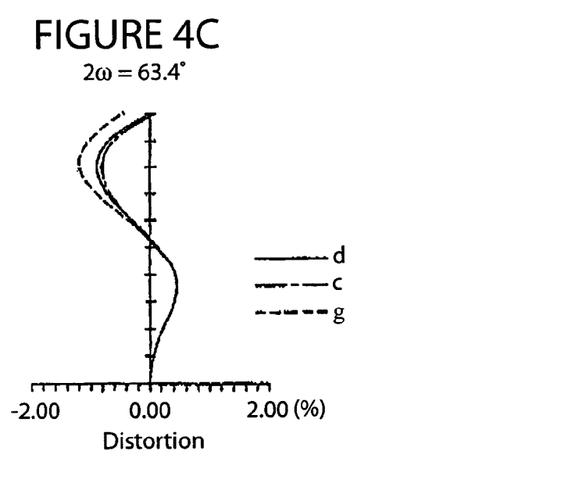
Figure 4D:
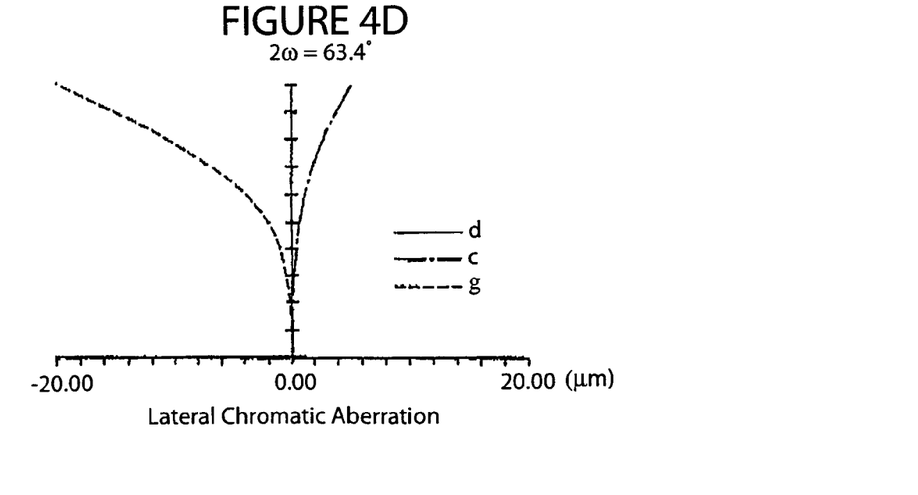
Figure 5:
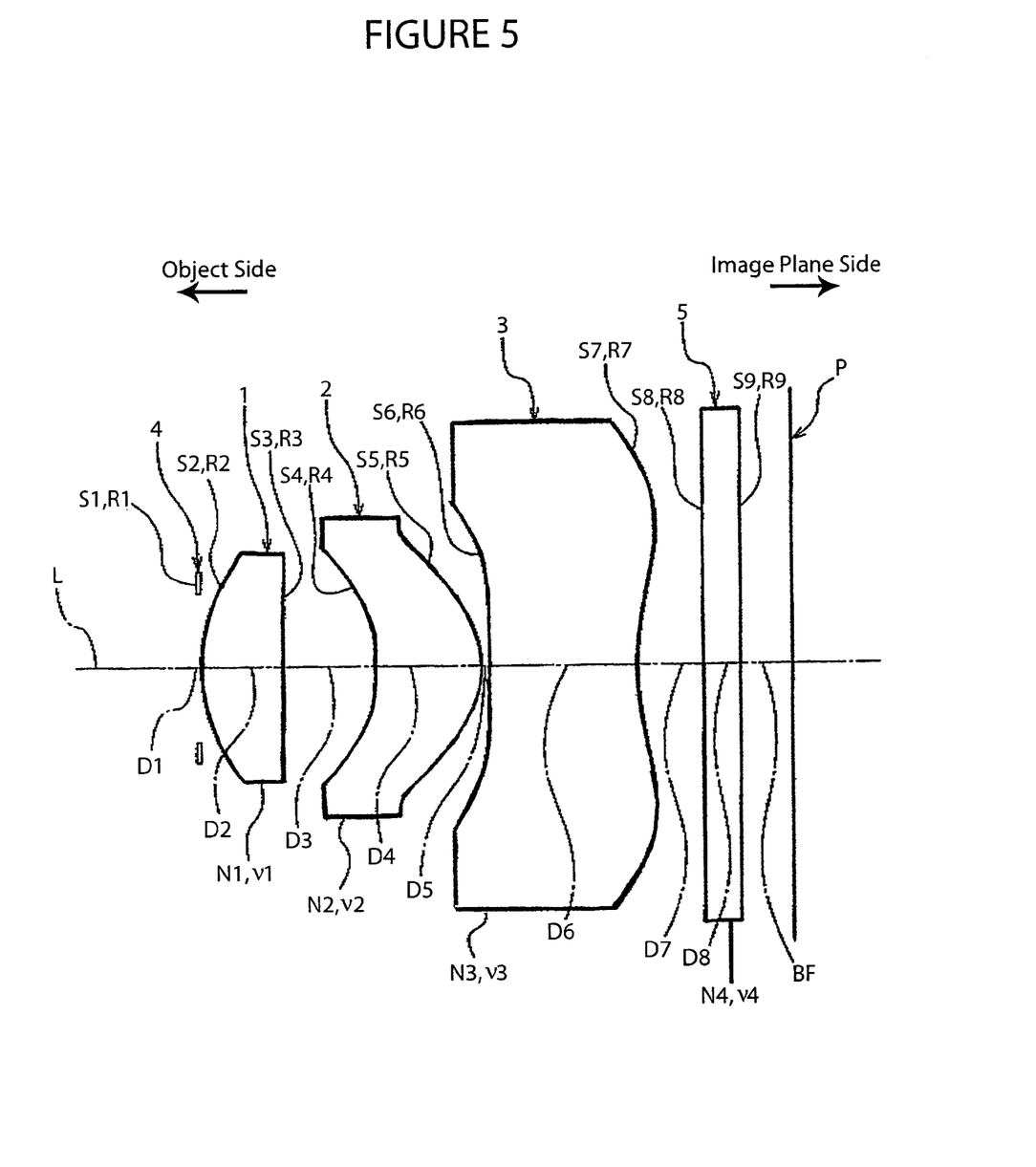
FIG. 5 is a drawing showing the structure of an imaging lens according to the third embodiment of the present invention.
Figure 6A:
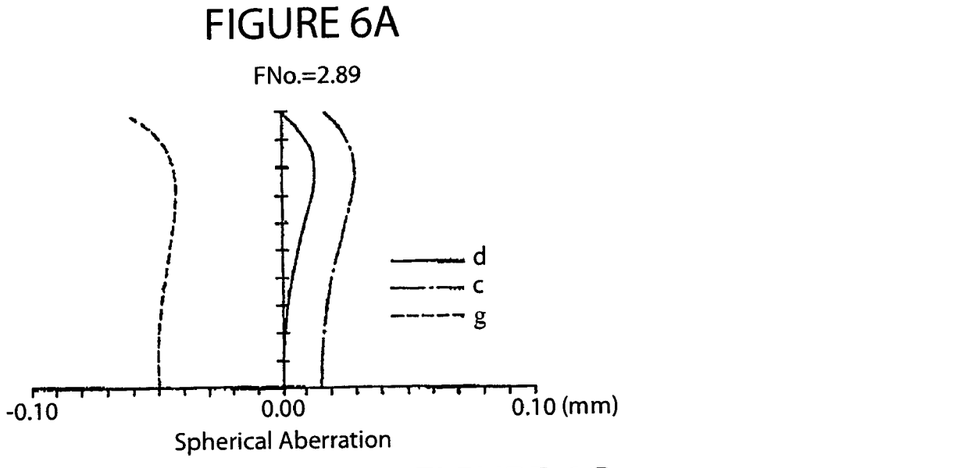
FIGS. 6A–6D show aberration diagrams for spherical aberration, astigmatism, distortion, and lateral chromatic aberration for an imaging lens according to the third embodiment.
Figure 6B:
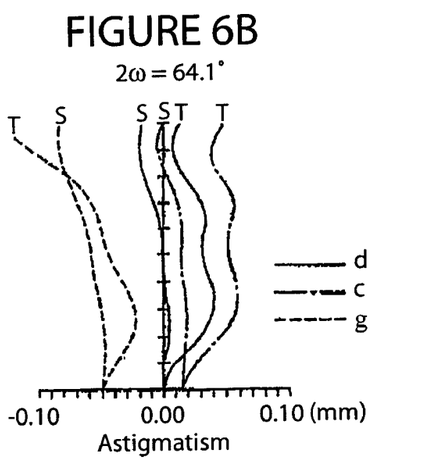
Figure 6C:
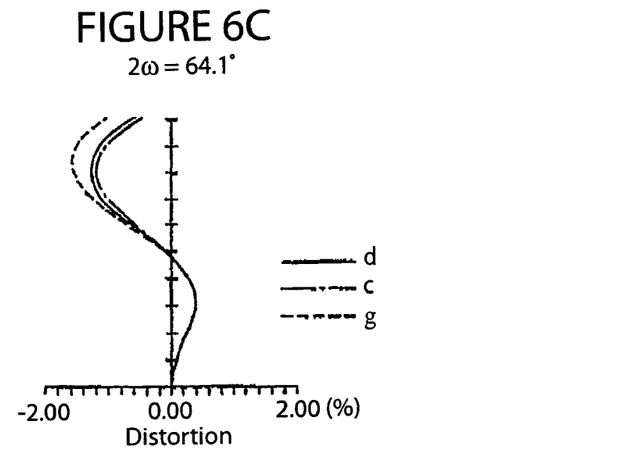
Figure 6D:
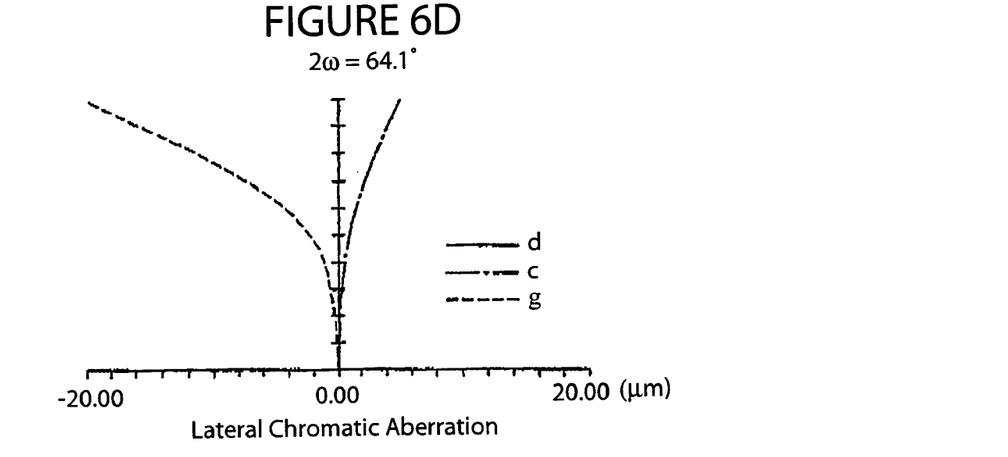

Working examples based on specific numerical values for the embodiment having the structure described above is described below as a first embodiment, a second embodiment, and a third embodiment. The structure of the first embodiment is shown in FIG. 1. The structure of the second embodiment is shown in FIG. 3. The structure of the third embodiment is shown in FIG. 5. For the aberration diagrams relating to spherical aberration, astigmatism, distortion, and lateral chromatic aberration, the results for the first embodiment are shown in FIG. 2, the results for the second embodiment are shown in FIG. 4, and the results for the third embodiment are shown in FIG. 6. In FIGS. 2, 4, and 6, D represents the aberration from the line d, G represents the aberration from the line g, C represents the aberration from the line c, S represents the aberration on the sagittal plane, and T represents the aberration on the meridional plane.

Since the structures shown in FIGS. 3 and 5 are essentially identical to the structure shown in FIG. 1, the descriptions of these structures are omitted.

FIG. 1 shows the basic structure of a lens system according to the first embodiment. Table 1 shows the main specifications. Table 2 shows various numerical data (settings). Table 3 shows numerical data relating to the aspherical surfaces.

In this embodiment, the numerical data for the conditions (1)–(6) are as follows:

$$TL/f=7.725/5.94=1.30; \quad (1)$$

$$\nu1=70.2,\ \nu2=56.4,\ \nu3=30.3; \quad (2)$$

$$|R4|/|R5|=1.54; \quad (3)$$

$$|R6|/|R7|=6.48; \quad (4)$$

$$D5/f=0.017;\ \text{and} \quad (5)$$

$$D4/D6=0.69. \quad (6)$$

TABLE 1

| | | | |
|---|---|---|---|
| Focal Length f (mm) | 5.94 | Total Length TL of Lens System (air conversion distance used for D8 (glass filter 5)) (mm) | 7.725 |
| F Number (FNo.) | 2.89 | Back Focus (Air Conversion) (mm) | 1.89 |
| Field Angle (2ω) | 62.6° | Object Distance | infinity (∞) |

TABLE 2

| Surface | Curvature Radius (mm) | | Distance (mm) | | Index of Refraction (d line) | Abbe Number |
|---|---|---|---|---|---|---|
| S1 | R1 | ∞ Aperture Stop | | | | |
| | | | D1 | 0.000 | | |
| S2 | R2 | 2.707 | D2 | 1.050 | N1 | ν1 |
| S3 | R3 | 52.630 | | | 1.48749 | 70.2 |
| | | | D3 | 1.277 | | |
| S4* | R4 | −2.149 | D4 | 1.396 | N2 | ν2 |

TABLE 2-continued

| Surface | Curvature Radius (mm) | | Distance (mm) | | Index of Refraction (d line) | Abbe Number |
|---|---|---|---|---|---|---|
| S5* | R5 | −1.396 | | | 1.50914 | 56.4 |
| | | | D5 | 0.100 | | |
| S6* | R6 | −19.224 | D6 | 2.012 | N3 | ν3 |
| S7* | R7 | 2.968 | | | 1.58385 | 30.3 |
| | | | D7 | 0.850 | | |
| S8 | R8 | ∞ | D8 | 0.500 | N4 | ν4 |
| S9 | R9 | ∞ | | | 1.51680 | 64.2 |
| | | | BF | 0.710 | | |

*aspherical surface

TABLE 3

| Aspherical Surface Coefficient | | Numerical Data |
|---|---|---|
| Surface S4 | ε | −4.14753 |
| | D | $-0.8479031 \times 10^{-1}$ |
| | E | $0.13803811 \times 10^{-1}$ |
| | F | $0.11833418 \times 10^{-2}$ |
| | G | $0.76464016 \times 10^{-3}$ |
| | H | $-0.26368256 \times 10^{-3}$ |
| Surface S5 | ε | 0.0 |
| | D | $0.23608628 \times 10^{-2}$ |
| | E | $-0.23379751 \times 10^{-2}$ |
| | F | $0.16716167 \times 10^{-2}$ |
| | G | $0.26270882 \times 10^{-5}$ |
| | H | $0.54206846 \times 10^{-5}$ |
| Surface S6 | ε | 21.93088 |
| | D | $-0.22186825 \times 10^{-1}$ |
| | E | $0.5820376 \times 10^{-2}$ |
| | F | $-0.68162648 \times 10^{-3}$ |
| | G | $-0.65539776 \times 10^{-5}$ |
| | H | $-0.16562157 \times 10^{-6}$ |
| Surface S7 | ε | −7.679559 |
| | D | $-0.17670503 \times 10^{-1}$ |
| | E | $0.17253962 \times 10^{-2}$ |
| | F | $-0.11611251 \times 10^{-3}$ |
| | G | $0.2479807 \times 10^{-5}$ |
| | H | $0.38244286 \times 10^{-8}$ |

In the first embodiment described above, the lens system total length TL (from the aperture stop 4 to the image surface P) is 7.725 mm (air conversion), back focus (air conversion) is 1.89 mm, the F number (FNo) is 2.89, the field angle (2ω) is 62.6 degrees. This provides an imaging lens with superior optical properties that is bright (small F number), thin, with short total length, and that effectively corrects for various aberrations.

FIG. 3 shows the basic structure of a lens system according to the second embodiment. Table 4 shows the main specifications. Table 5 shows various numerical data (settings). Table 6 shows numerical data relating to the aspherical surfaces.

In this working example, the numerical data for the conditions (1)–(6) are as follows:

$$TL/f=7.648/5.83=1.31; \quad (1)$$

$$\nu1=70.2,\ \nu2=56.4,\ \nu3=30.3; \quad (2)$$

$$|R4|/|R5|=1.54; \quad (3)$$

$$|R6|/|R7|=7.79; \quad (4)$$

$$D5/f=0.017;\ \text{and} \quad (5)$$

$$D4/D6=0.70. \quad (6)$$

TABLE 4

| Focal Length f (mm) | 5.83 | Total Length TL of Lens System (air conversion distance used for D8 (glass filter 5)) (mm) | 7.648 |
|---|---|---|---|
| F Number (FNo.) | 2.89 | Back Focus (Air Conversion) (mm) | 1.83 |
| Field Angle (2ω) | 63.4° | Object Distance | infinity (∞) |

TABLE 5

| Surface | Curvature Radius (mm) | | Distance (mm) | Index of Refraction (d line) | Abbe Number |
|---|---|---|---|---|---|
| S1 | R1 | ∞ | | | |
| | Aperture Stop | | | | |
| | | | D1 0.000 | | |
| S2 | R2 | 2.701 | D2 1.050 | N1 | ν1 |
| S3 | R3 | 59.221 | | 1.48749 | 70.2 |
| | | | D3 1.278 | | |
| S4* | R4 | −2.150 | D4 1.394 | N2 | ν2 |
| S5* | R5 | −1.396 | | 1.50914 | 56.4 |
| | | | D5 0.100 | | |
| S6* | R6 | −22.638 | D6 1.996 | N3 | ν3 |
| S7* | R7 | 2.906 | | 1.58385 | 30.3 |
| | | | D7 0.850 | | |
| S8 | R8 | ∞ | D8 0.500 | N4 | ν4 |
| S9 | R9 | ∞ | | 1.51680 | 64.2 |
| | | | BF 0.650 | | |

*aspherical surface

TABLE 6

| Aspherical Surface Coefficient | | Numerical Data |
|---|---|---|
| Surface S4 | ε | −4.10685 |
| | D | −0.85084519 × $10^{-1}$ |
| | E | 0.13805938 × $10^{-1}$ |
| | F | 0.12285089 × $10^{-2}$ |
| | G | 0.77078745 × $10^{-3}$ |
| | H | −0.26802678 × $10^{-3}$ |
| Surface S5 | ε | 0.0 |
| | D | 0.24149207 × $10^{-2}$ |
| | E | −0.23264192 × $10^{-2}$ |
| | F | 0.16797172 × $10^{-2}$ |
| | G | 0.16064767 × $10^{-5}$ |
| | H | 0.54462375 × $10^{-5}$ |
| Surface S6 | ε | 16.6869 |
| | D | −0.22045978 × $10^{-1}$ |
| | E | 0.58080814 × $10^{-2}$ |
| | F | −0.68116022 × $10^{-3}$ |
| | G | −0.60302413 × $10^{-5}$ |
| | H | −0.56936882 × $10^{-7}$ |
| Surface S7 | ε | −7.107814 |
| | D | −0.17520637 × $10^{-1}$ |
| | E | 0.17388231 × $10^{-2}$ |
| | F | −0.11586868 × $10^{-3}$ |
| | G | 0.24059919 × $10^{-5}$ |
| | H | 0.43070062 × $10^{-8}$ |

In the second embodiment described above, the lens system total length TL (from the aperture stop 4 to the image surface P) is 7.648 mm (air conversion), back focus (air conversion) is 1.83 mm, the F number (FNo) is 2.89, the field angle (2ω) is 63.4 degrees. This provides an imaging lens with superior optical properties that is bright (small F number), thin, with short total length, and that effectively corrects for various aberrations.

FIG. 5 shows the basic structure of a lens system according to the third embodiment. Table 7 shows the main specifications. Table 8 shows various numerical data (settings). Table 9 shows numerical data relating to the aspherical surfaces.

In this embodiment, the numerical data for the conditions (1)–(6) are as follows:

$$TL/f = 7.62/5.78 = 1.32; \quad (1)$$

$$\nu 1 = 70.2, \nu 2 = 56.4, \nu 3 = 30.3; \quad (2)$$

$$|R4|/|R5| = 1.53; \quad (3)$$

$$|R6|/|R7| = 9.13; \quad (4)$$

$$D5/f = 0.017; \text{ and} \quad (5)$$

$$D4/D6 = 0.71. \quad (6)$$

TABLE 7

| Focal Length f (mm) | 5.78 | Total Length TL of Lens System (air conversion distance used for D8 (glass filter 5)) (mm) | 7.620 |
|---|---|---|---|
| F Number (FNo.) | 2.89 | Back Focus (Air Conversion) (mm) | 1.85 |
| Field Angle (2ω) | 64.1° | Object Distance | infinity (∞) |

TABLE 8

| Surface | Curvature Radius (mm) | | Distance (mm) | Index of Refraction (d line) | Abbe Number |
|---|---|---|---|---|---|
| S1 | R1 | ∞ | | | |
| | Aperture Stop | | | | |
| | | | D1 0.000 | | |
| S2 | R2 | 2.707 | D2 1.050 | N1 | ν1 |
| S3 | R3 | 66.631 | | 1.48749 | 70.2 |
| | | | D3 1.229 | | |
| S4* | R4 | −2.141 | D4 1.407 | N2 | ν2 |
| S5* | R5 | −1.396 | | 1.50914 | 56.4 |
| | | | D5 0.100 | | |
| S6* | R6 | −26.318 | D6 1.984 | N3 | ν3 |
| S7* | R7 | 2.883 | | 1.58385 | 30.3 |
| | | | D7 0.850 | | |
| S8 | R8 | ∞ | D8 0.500 | N4 | ν4 |
| S9 | R9 | ∞ | | 1.51680 | 64.2 |
| | | | BF 0.670 | | |

*aspherical surface

TABLE 9

| Aspherical Surface Coefficient | | Numerical Data |
|---|---|---|
| Surface S4 | ε | −4.133764 |
| | D | −0.85399701 × $10^{-1}$ |
| | E | 0.13753195 × $10^{-1}$ |
| | F | 0.1284789 × $10^{-2}$ |
| | G | 0.7871367 × $10^{-3}$ |
| | H | −0.27229081 × $10^{-3}$ |
| Surface S5 | ε | 0.0 |
| | D | 0.25904634 × $10^{-2}$ |
| | E | −0.22936834 × $10^{-2}$ |
| | F | 0.1672613 × $10^{-2}$ |
| | G | −0.15153239 × $10^{-5}$ |
| | H | 0.58226132 × $10^{-5}$ |
| Surface S6 | ε | 16.93515 |
| | D | −0.22052877 × $10^{-1}$ |

TABLE 9-continued

| Aspherical Surface Coefficient | | Numerical Data |
|---|---|---|
| | E | $0.57846857 \times 10^{-2}$ |
| | F | $-0.67977882 \times 10^{-3}$ |
| | G | $-0.53894679 \times 10^{-5}$ |
| | H | $0.53941345 \times 10^{-7}$ |
| Surface S7 | $\epsilon$ | $-7.00312$ |
| | D | $-0.17650433 \times 10^{-1}$ |
| | E | $0.17537839 \times 10^{-2}$ |
| | F | $-0.11569205 \times 10^{-3}$ |
| | G | $0.23483359 \times 10^{-5}$ |
| | H | $0.42411255 \times 10^{-8}$ |

In the third embodiment described above, the lens system total length TL (from the aperture stop 4 to the image plane P) is 7.62 mm (air conversion), back focus (air conversion) is 1.85 mm, the F number (FNo) is 2.89, the field angle (2ω) is 64.1 degrees. This provides an imaging lens with superior optical properties that is bright (small F number), thin, with short total length, and that effectively corrects for various aberrations.

As described above, the imaging lens of the present invention can, of course, be used as an imaging lens for digital still cameras and digital video cameras equipped with solid state elements such as CCD or a CMOS. More specifically, the present invention can be used as an imaging lens for compact mobile cameras installed in portable devices such as portable telephones, portable personal computers, and personal digital assistants (PDA).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An imaging lens comprising, in sequence from an object side to an image plane side:
   an aperture stop with a predetermined diameter;
   a first lens with an overall positive refractive power having a convex surface facing toward the object side;
   a second lens with an overall positive refractive power having a concave surface facing toward the object side; and
   a third lens with an overall negative refractive power having a concave surface facing toward the object side;
   wherein the imaging lens includes only three lenses, the first lens, the second lens, and the third lens;
   wherein said second lens is formed with aspherical surfaces on said object side surface and an image plane side surface; and
   wherein said third lens is formed with aspherical surfaces on said object side surface and an image plane side surface and is formed with an inflection point, where a curvature orientation changes, within an effective diameter range of said aspherical surface on said image plane side surface.

2. An imaging lens comprising, in sequence from an object side to an image plane side:
   an aperture stop with a predetermined diameter;
   a first lens with an overall positive refractive power having a convex surface facing toward the object side and having a meniscus shape with said convex surface facing toward the object side and a concave surface facing toward the image plane side;
   a second lens with an overall positive refractive power having a concave surface facing toward the object side; and
   a third lens with an overall negative refractive power having a concave surface facing toward the object side;
   wherein said second lens is formed with aspherical surfaces on said object side surface and an image plane side surface; and
   wherein said third lens is formed with aspherical surfaces on said object side surface and an image plane side surface and is formed with an inflection point, where a curvature orientation changes, within an effective diameter range of said aspherical surface on said image plane side surface.

3. An imaging lens as described in claim 1 wherein said object-side aspherical surface of said third lens is formed so that a refractive power thereof increases toward a perimeter section thereof.

4. An imaging lens as described in claim 1 wherein said second lens and said third lens are formed from a resin material.

5. An imaging lens as described in claim 1 wherein:

$TL/f<1.4$ where f is a focal length of a lens system, and TL is a total length of said lens system from said aperture stop to said image plane.

6. An imaging lens comprising, in sequence from an object side to an image plane side:
   an aperture stop with a predetermined diameter;
   a first lens with an overall positive refractive power having a convex surface facing toward the object side;
   a second lens with an overall positive refractive power having a concave surface facing toward the object side; and
   a third lens with an overall negative refractive power having a concave surface facing toward the object side;
   wherein said second lens is formed with aspherical surfaces on said object side surface and an image plane side surface;
   wherein said third lens is formed with aspherical surfaces on said object side surface and an image plane side surface and is formed with an inflection point, where a curvature orientation changes, within an effective diameter range of said aspherical surface on said image plane side surface; and wherein:

$v1>45, v2>45, v3<45$ where v1 is the Abbe number of said first lens, v2 is the Abbe number of said second lens, and v3 is the Abbe number of said third lens.

7. An imaging lens comprising, in sequence from an object side to an image plane side:
   an aperture stop with a predetermined diameter;
   a first lens with an overall positive refractive power having a convex surface facing toward the object side;
   a second lens with an overall positive refractive power having a concave surface facing toward the object side; and
   a third lens with an overall negative refractive power having a concave surface facing toward the object side;
   wherein said second lens is formed with aspherical surfaces on said object side surface and an image plane side surface;

wherein said third lens is formed with aspherical surfaces on said object side surface and an image plane side surface and is formed with an inflection point, where a curvature orientation changes, within an effective diameter range of said aspherical surface on said image plane side surface; and wherein:

$$1<|R4|/|R5|<2$$

$$6<|R6|/|R7|<10$$

where R4 is a curvature radius of said object-side surface of said second lens, R5 is a curvature radius of said image-plane side surface of said second lens, R6 is a curvature radius of said object-side surface of said third lens, and R7 is a curvature radius of said image-plane side surface of said third lens.

8. An imaging lens as described in claim 1 wherein:

$$D5/f<0.15$$

where f is a focal length of a lens system, and D5 is a distance along an optical axis between said second lens and said third lens.

9. An imaging lens comprising, in sequence from an object side to an image plane side:
    an aperture stop with a predetermined diameter;
    a first lens with an overall positive refractive power having a convex surface facing toward the object side;
    a second lens with an overall positive refractive power having a concave surface facing toward the object side; and
    a third lens with an overall negative refractive power having a concave surface facing toward the object side;
    wherein said second lens is formed with aspherical surfaces on said object side surface and an image plane side surface;
    wherein said third lens is formed with aspherical surfaces on said object side surface and an image plane side surface and is formed with an inflection point, where a curvature orientation changes, within an effective diameter range of said aspherical surface on said image plane side surface; and wherein:

$$0.45<D4/D6<1.0$$

where D4 is a thickness along an optical axis of said second lens and D6 is a thickness along said optical axis of said third lens.

10. An imaging lens as described in claim 2 wherein said object-side aspherical surface of said third lens is formed so that a refractive power thereof increases toward a perimeter section thereof.

11. An imaging lens as described in claim 2 wherein said second lens and said third lens are formed from a resin material.

12. An imaging lens as described in claim 3 wherein said second lens and said third lens are formed from a resin material.

13. An imaging lens as described in claim 2 wherein:

$$TL/f<1.4$$

where f is a focal length of a lens system, and TL is a total length of said lens system from said aperture stop to said image plane.

14. An imaging lens as described in claim 3 wherein:

$$TL/f<1.4$$

where f is a focal length of a lens system, and TL is a total length of said lens system from said aperture stop to said image plane.

15. An imaging lens as described in claim 4 wherein:

$$TL/f<1.4$$

where f is a focal length of a lens system, and TL is a total length of said lens system from said aperture stop to said image plane.

16. An imaging lens as described in claim 2 wherein:

$$v1>45, v2>45, v3<45$$

where v1 is the Abbe number of said first lens, v2 is the Abbe number of said second lens, and v3 is the Abbe number of said third lens.

17. An imaging lens as described in claim 3 wherein:

$$v1>45, v2>45, v3<45$$

where v1 is the Abbe number of said first lens, v2 is the Abbe number of said second lens, and v3 is the Abbe number of said third lens.

18. An imaging lens as described in claim 4 wherein:

$$v1>45, v2>45, v3<45$$

where v1 is the Abbe number of said first lens, v2 is the Abbe number of said second lens, and v3 is the Abbe number of said third lens.

19. An imaging lens as described in claim 5 wherein:

$$v1>45, v2>45, v3<45$$

where v1 is the Abbe number of said first lens, v2 is the Abbe number of said second lens, and v3 is the Abbe number of said third lens.

* * * * *